United States Patent
Hisahara et al.

(10) Patent No.: US 7,409,937 B2
(45) Date of Patent: Aug. 12, 2008

(54) HYDRAULIC CONTROL SYSTEM FOR INTERNAL COMBUSTION ENGINE

(75) Inventors: Keiji Hisahara, Kanagawa (JP); Toshiro Ichikawa, Kanagawa (JP); Seiji Suga, Kanagawa (JP); Osamu Fujita, Kanagawa (JP); Takanori Sawada, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/588,246

(22) Filed: Oct. 27, 2006

(65) Prior Publication Data

US 2007/0095316 A1 May 3, 2007

(30) Foreign Application Priority Data

Oct. 31, 2005 (JP) ............................ 2005-316572
Sep. 19, 2006 (JP) ............................ 2006-252255

(51) Int. Cl.
*F01L 1/34* (2006.01)
(52) U.S. Cl. .............. 123/90.17; 123/90.12; 123/90.15; 464/160; 251/12; 137/625.69
(58) Field of Classification Search ............. 123/90.15, 123/90.16, 90.17, 90.18, 90.12, 90.13; 464/1, 464/2, 160; 137/625, 625.2, 625.69; 251/12
See application file for complete search history.

(56) References Cited

U.S. PATENT DOCUMENTS

| 4,971,116 A | 11/1990 | Suzuki et al. |
| 6,289,921 B1 | 9/2001 | Neuhaus et al. |
| 6,701,877 B1 * | 3/2004 | Ottersbach et al. ....... 123/90.17 |
| 2003/0047698 A1 | 3/2003 | Ha |
| 2005/0045129 A1 | 3/2005 | Bu |
| 2005/0081810 A1 | 4/2005 | Isobe et al. |

FOREIGN PATENT DOCUMENTS

| DE | 197 27 180 A1 | 1/1999 |
| DE | 199 08 146 A1 | 8/2000 |
| DE | 100 44 486 A1 | 4/2001 |
| EP | 1 052 378 A2 | 11/2000 |
| EP | 1 213 449 A2 | 6/2002 |
| EP | 1 447 602 A1 | 8/2004 |
| EP | 1 455 127 A2 | 9/2004 |
| JP | 11-141359 | 5/1999 |

* cited by examiner

*Primary Examiner*—Ching Chang
(74) *Attorney, Agent, or Firm*—Foley & Lardner LLP

(57) ABSTRACT

A hydraulic control system for an internal combustion engine, includes a driven mechanism driven by hydraulic pressure fed through a flowing passage change-over valve. The flowing passage change-over valve includes a valve body formed with a plurality of ports which are respectively communicated with the supply passage and the oil passage, and a spool valve body slidably disposed in the valve body to open and close the plurality of ports, the ports including a supplying port communicated with the supplying passage. The maximum cross-sectional area of the supplying port is larger than a minimum cross-sectional area of the supplying passage. The flowing passage change-over valve is supplied with electric current to heat hydraulic fluid kept in the flowing passage change-over valve so as to lower a viscosity of the hydraulic fluid.

10 Claims, 13 Drawing Sheets

HYDRAULIC CONTROL SYSTEM FOR INTERNAL COMBUSTION ENGINE

BACKGROUND OF THE INVENTION

This invention relates to improvements in a hydraulic control system used, for example, in a valve timing control system to change opening and closing timings of an intake valve and an exhaust valve in an internal combustion engine.

Hitherto various types of valve timing control systems have been proposed and put into practical use. One of such valve timing control systems is disclosed in Japanese Patent Provisional Publication No. 11-141359. This valve timing control system is a vane type and applied to an intake side. The valve timing control system includes a timing sprocket having a cylindrical housing whose front and rear open ends are respectively closed with a front cover and a rear cover. A vane member fixed to a cam shaft is rotatably accommodated within the housing. The housing is provided at its inner peripheral surface with generally trapezoidal two shoes which extend radially and inwardly. A timing-advancing chamber and a timing-retarding chamber are formed separate from each other, in which each chamber is defined between one of the two shoes and one of two vanes (or blade portions) of the vane member.

A hydraulic fluid (or lubricating oil) discharged from an oil pump for the lubricating oil is flowed through a main oil gallery formed in a cylinder block to a flowing passage change-over valve (or oil control valve) so as to be selectively supplied to each timing-advancing chamber and each timing-retarding chamber.

More specifically, the flowing passage change-over valve includes therein a spool valve body which is slidably movable in an axial direction by a control current output from an electronic controller in accordance with an engine operating condition thereby selectively opening and closing each port formed in a valve body. With this, communication between the main oil gallery and oil passages which are respectively communicated with each timing-advancing chamber and each timing-retarding chamber is relatively changed over thereby supplying hydraulic fluid to or draining hydraulic fluid from each timing-advancing chamber and each timing-retarding chamber.

Consequently, the vane member is rotated in right and reverse directions thereby changing a relative rotational phase between the timing sprocket and the cam shaft to a timing-advancing side or a timing-retarding side, so that the opening and closing timings of the intake valve is variably controlled.

SUMMARY OF THE INVENTION

In the valve timing control system in the above conventional technique, the opening cross-sectional area of the each port formed in the valve body of the above flowing passage change-over valve is set taking account of a passage resistance of the hydraulic oil passed through the above main oil gallery. The main oil gallery is formed relatively large in length to the flowing passage change-over valve and includes many bent portions and stepwise portions throughout its length, so that the hydraulic fluid is subjected to a large passage resistance.

Therefore, the above each port whose passage length is sufficiently shorter than that of the main oil gallery is considered to be not large in the passage resistance. Consequently, the maximum opening cross-sectional area of each port is set smaller than or the same as the minimum passage cross-sectional area of the main oil gallery.

However, the opening cross-sectional area of each port opened and closed by the above spool valve body is controlled by a sharp end edge of a land portion of the spool valve body. Additionally, the flowing passage is bent generally at an acute angle within the valve body whose inside is communicated with the ports. Furthermore, the passage cross-sectional area largely changes from the ports to the inside of the valve body so that the hydraulic fluid passing through here is repeatedly expanded and compressed, and therefore a large passage resistance is generated also in the valve body. Particularly at cold engine starting or the like where the hydraulic fluid is high in temperature, it is remarkable that the passage resistance of the hydraulic fluid is increased.

As a result, for example at the engine starting, an in-flow speed of the hydraulic fluid supplied from the oil pump through the flowing passage change-over valve to each timing-advancing chamber and to each timing-retarding chamber is lowered thereby lowering a rotational response of the vane member in one direction. Consequently, there may arise a fear of lowering a control response for changing the relative rotational phase between the crank shaft and the cam shaft.

In view of the above problems, it is an object of the present invention is to provide an improved hydraulic control system for an internal combustion engine, which can effectively overcome drawbacks encountered in conventional hydraulic control systems for an internal combustion engine.

Another object of the present invention is to provide an improved hydraulic control system for an internal combustion engine, by which a speed of the hydraulic fluid supplied to a driven mechanism becomes faster than that in the conventional technique thereby improving a driving response in the driven mechanism.

A further object of the present invention is to provide an improved hydraulic control system for an internal combustion engine, by which a flowing passage resistance of hydraulic fluid flowed from a supplying passage through a flowing passage change-over valve into the driven mechanism can be sufficiently reduced.

An aspect of the present invention resides in a hydraulic control system for an internal combustion engine, comprising a driven mechanism driven by hydraulic pressure fed under pressure from an oil pump of the internal combustion engine. A flowing passage change-over valve is provided for controlling hydraulic pressure supplied from the oil pump to the driven mechanism. A supplying passage is fluidly disposed between the oil pump and the flowing passage change-over valve. Additionally, an oil passage is fluidly disposed between the flowing passage change-over valve and the driven mechanism. In the above arrangement, the flowing passage change-over valve includes a valve body formed with a plurality of ports which are respectively communicated with the supply passage and the oil passage, and a spool valve body slidably disposed in the valve body to open and close the plurality of ports, the ports including a supplying port communicated with the supplying passage. Additionally, a maximum cross-sectional area of the supplying port is larger than a minimum cross-sectional area of the supplying passage. Further the flowing passage change-over valve is supplied with electric current to heat hydraulic fluid kept in the flowing passage change-over valve so as to lower a viscosity of the hydraulic fluid.

Another aspect of the present invention resides in a hydraulic control system for an internal combustion engine, comprising a driven mechanism driven by hydraulic pressure fed under pressure from an oil pump of the internal combustion engine. A supplying passage is communicated with the oil pump. An oil passage is communicated with the driven mechanism. Additionally, a flowing passage change-over valve is provided for controlling hydraulic pressure supplied from the oil pump to the driven mechanism and includes a port valve body formed with a supplying port communicated with the supplying passage, and an oil passage port communicated with the oil passage, and a spool valve body slidably disposed inside the valve body to open and close at least one of the supplying port and the oil passage port, a maximum cross-sectional area of the supplying port being larger than a minimum cross-sectional area of the supplying passage. In the above arrangement, the flowing passage change-over valve is supplied with electric current before starting of the internal combustion engine to discharge hydraulic fluid kept in the flowing passage change-over valve, and supplied with electric current at the starting of the internal combustion engine to heat hydraulic fluid kept in the flowing passage change-over valve so as to lower a viscosity of the hydraulic fluid.

A further aspect of the present invention resides in a method of controlling a variable valve mechanism, comprising the steps of: (a) receiving hydraulic fluid fed under pressure from an oil pump of an internal combustion engine through a supplying passage in a port of a flowing passage change-over valve which port has a maximum opening cross-sectional area larger than a minimum passage cross-sectional area of the supplying passage; (b) controlling a flowing passage change-over valve for controlling the hydraulic fluid upon changing a flowing passage to another port by using a spool valve body slidably disposed in a valve body to open and close the port; and (c) heating hydraulic fluid kept in the flowing passage change-over valve by supplying electric current to the flowing passage change-over valve at starting of the internal combustion engine, the electric current being supplied for a predetermined period to lower a viscosity of the hydraulic fluid.

BRIEF DESCRIPTION OF THE DRAWINGS

In the drawings, like reference numerals designate like parts and elements throughout all figures in which.

Figure 1:
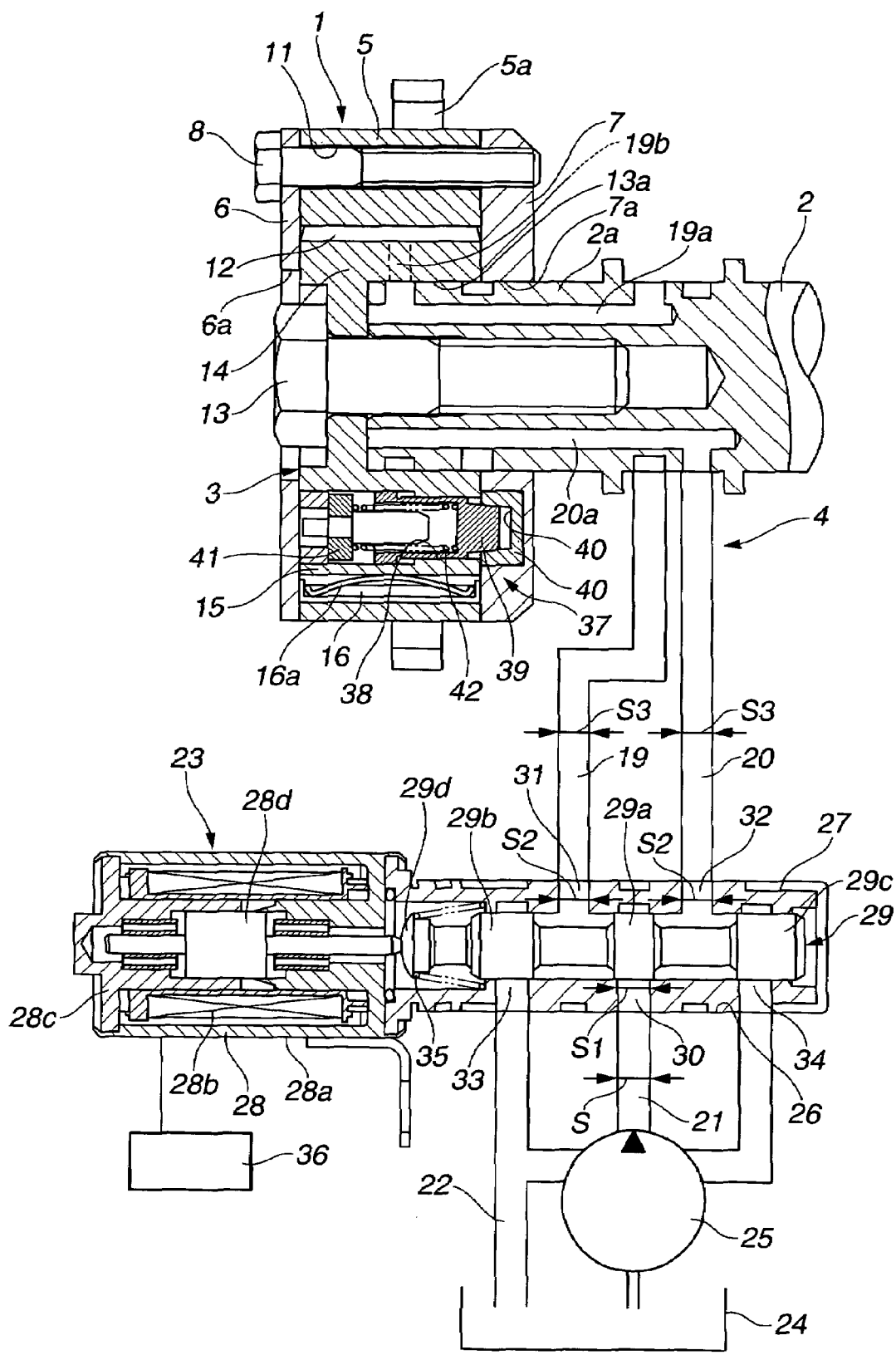
FIG. 1 is a cross-sectional view of a valve timing control (VTC) system as an embodiment of a hydraulic pressure control system according to the present invention.

The other objects and features of this invention will become understood from the following description with reference to the accompanying drawings.

DETAILED DESCRIPTION OF THE INVENTION

Referring now to attached drawings, an embodiment of a hydraulic control system according to the present invention for an internal combustion engine is illustrated. In this embodiment, the hydraulic control system is applied to a side of an intake valve of a valve timing control (VTC) system, similarly to in the conventional technique disclosed in Japanese Patent Provisional Publication No. 11-141359.

FIGS. 1 to 4 illustrate the hydraulic control system which includes timing sprocket 1 as a driving member which is rotatably driven by a crankshaft (not shown) of an engine through a timing chain (not shown). Cam shaft 2 is provided to be relatively rotatable to timing sprocket 1. Vane member 3 as a driven member is fixed to an end portion of cam shaft 2 and accommodated to be freely rotatable within timing sprocket 1. Vane member 3 is rotated in forward and reverse directions by hydraulic circuit 4.

Above timing sprocket 1 is integrally formed at its outer peripheral surface with teeth portion 5a with which the timing chain is engaged. Timing sprocket 1 includes housing 5 in which vane member 3 is freely rotatably accommodated. Disk-shaped front cover 6 as a rid member is provided to close a front end opening of housing 5. Generally disk-shaped rear cover 7 is provided to close a rear end opening of housing 5. Housing 5, front cover 6 and rear cover 7 are fastened and fixed together in an axial direction as a single member through four bolts 8 which respectively have small diameters.

Above housing 5 is formed into a cylindrical shape wherein which both front and rear ends are opened. Housing 5 is formed at its inner peripheral surface with four partition portions as shoes which are located respectively at positions corresponding to about 90 degrees angle in a peripheral direction and radially inwardly extend. Each partition portion 10 is formed into a generally trapezoidal shape in cross-section and extends in an axial direction of housing 5. End faces of housing 5 and that of partition portion 10 are flush with each other in the axial direction. Each partition portion 10 is formed at its generally central section with bolt insertion hole 11 into which each bolt 8 is inserted. Bolt insertion hole 11 penetrates partition portion 10 from one end to the other end in the axial direction of housing 5. An edge of partition portion 10 located at its inner end in the radial direction is shaped to be arcuate in section thereby being along an outer shape of vane member 14 of vane member 3 which will be described below. An inner end surface of partition portion 10 is formed at its upper section with retaining groove 11 which is formed upon being cut out in the axial direction of housing 5. Generally C-shaped seal member 12 and a plate spring (not shown) are fittingly retained within retaining groove 11 to push seal member 12 inward.

Above front cover 6 is formed at its central section with bolt insertion hole 6a which has a relative large diameter. Front cover 6 is formed at its outer peripheral section with four bolt holes which are respectively communicated with bolt insertion holes 8 formed at above housing 5.

Above rear cover 7 is formed at its central section with bearing hole 7a which freely rotatably supports front end section 2a of above cam shaft 2. Rear cover 7 is formed at its outer peripheral section with four female threaded holes with which above bolts 8 are respectively threadably engaged.

Above cam shaft 2 is freely rotatably supported at an upper end section of a cylinder head of an internal combustion engine through a cam bearing (not shown). Cam shaft 2 is integrally provided with a cam as a single member at a certain position in an outer peripheral surface of cam shaft 2 so that the cam operates an intake valve (not shown) to open through a valve lifter.

Above vane member 3 includes vane rotor 14 which is formed into a cylindrical shape and fixed to a front end portion of cam shaft 2 through cam bolt 13, and four vanes 15 disposed to vane rotor 14 and located at an outer peripheral surface of vane rotor 14 in which each vane 15 is positioned at a position corresponding to 90 degrees in a peripheral direction. Vane member 13 and vane rotor 14 are formed integral and made of a sintered alloy material. Above vane rotor 14 is formed at its central section with insertion hole 13a which is formed into a stepwise shape and penetrates vane rotor 14 in an axial direction. Into insertion hole 13a, above cam bolt 13 and front end section 2a of cam shaft 2 are inserted and fitted so that vane rotor 14 is fixed to front end section 2a of cam shaft 2 in the axial direction through above cam bolt 13.

Each of three vanes 15 of the four vanes is formed into an elongate rectangular shape in section, which one vane 15 is formed into a shape of a trapezoid in section and having a large width in a peripheral direction, so that vane member 3 is well balanced in weight as a whole. Each vane 15 is disposed between partition portions 10 and formed at a central section in an outer peripheral surface with a retaining groove which is formed upon cutting out. The retaining groove fittingly retains therein generally C-shaped (in section) seal member 16 and plate spring 16a so that seal member 16 is slidably contactable with the inner peripheral surface of housing 5 upon being pushed by plate spring 16a.

Four timing-advancing chambers 17 and four timing-retarding chambers 18 are respectively formed to be separate from each other, in which each chamber is defined between facing sides of each vane 15 and each partition portion 10.

As shown in FIGS. 1, 5 to 7, above hydraulic circuit 4 includes two hydraulic passage lines, i.e., first oil passage 19 through which hydraulic pressure as a lubricating oil is supplied to and drained from above each timing advancing chamber 17, and second oil passage 20 through which the hydraulic pressure is supplied to and drained from above each timing-retarding chamber 18. These oil passages 19 and 20 are connected through flowing passage change-over valve 23 for changing the oil passages, with supplying passage 21 as a main oil gallery for supplying the lubricating oil and with drain passage 22. Above supplying passage 21 is connected to one-way oil pump 25 pressurizing and feeding oil within oil pan 24. A downstream end of drain passage 22 is communicated with oil pan 24. Above supplying passage 21 is formed to be bent within a cylinder block (not shown) so that a cross-sectional area of supplying passage 21 is not always same throughout the length of passage 21, and therefore the passage may have a small cross-sectional area in some sections.

Figure 2:
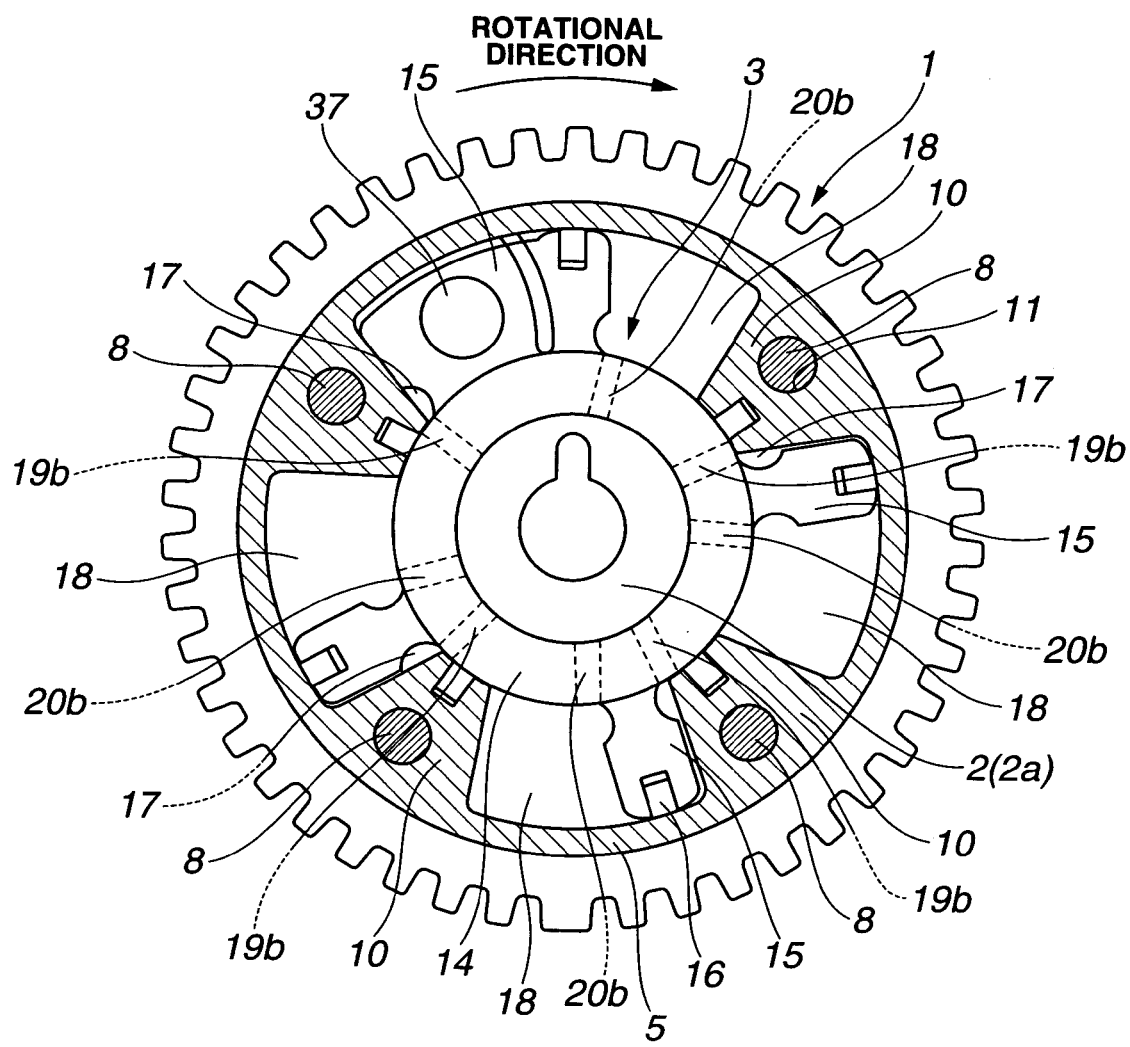
FIG. 2 is a cross-sectional view of the valve timing control system of FIG. 1, showing a state where a vane member is at a rotational position in a most timing-retarding side.

As shown in FIGS. 1 and 2, above first oil passage 19 is formed between above flowing passage change-over valve 23 and each timing-advancing chamber 17. First oil passage 19 includes a first passage part 19a which is formed from an inside of the cylinder head to an inside of the cam bearing and at an inside of cam shaft 2 and extends in an axial direction. Four branching passages 19b are branched off from a groove formed at a front end side of cam shaft 2 and radially extend inside vane rotor 14 thereby accomplishing communication between first passage part 19a and each timing-advancing chamber 17.

Second oil passage 20 is formed between above flowing passage change-over valve 23 and each timing-retarding chamber 18. Second oil passage 20 includes second passage part 20a which is formed from an inside of the cylinder head to an inside of the cam bearing and at an inside of cam shaft 2 and extends in an axial direction. Four branching passages 20b are branched off from a groove formed at a front end side of cam shaft 2 and radially extend inside vane rotor 14 thereby accomplishing communication between second passage part 20a and each timing-retarding chamber 18.

A phase changing mechanism as a driven mechanism is constituted of above vane member 3, housing 5, each timing-advancing chamber 17, each timing retarding chamber 18 or the like.

Figure 5:
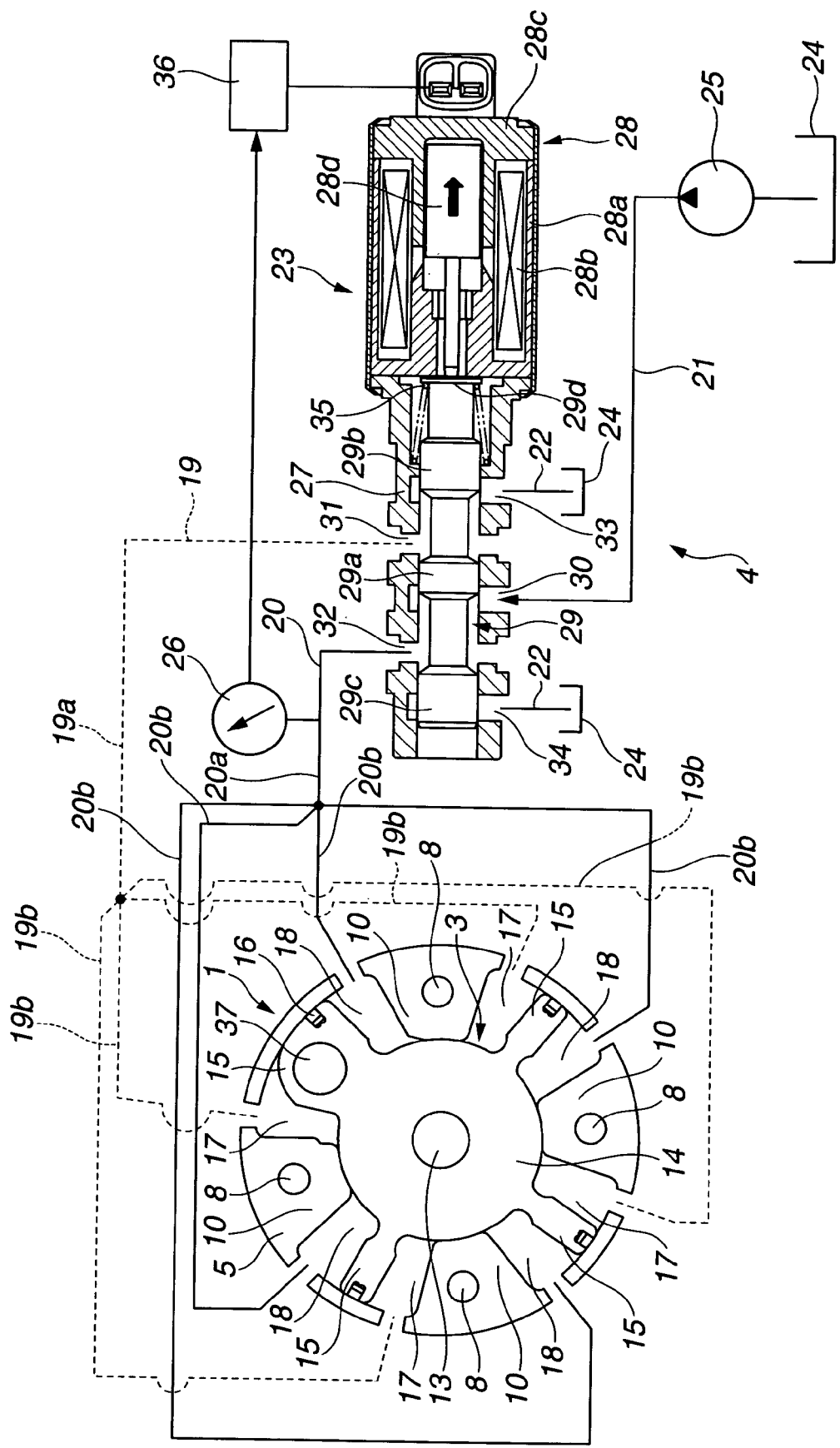
FIG. 5 is a schematic illustration showing an operational state of a flowing passage change-over valve of FIG. 1.

As shown in FIGS. 1 and 5, above flowing passage change-over valve 23 is a solenoid valve of a so-called 4-port 2-position type and includes valve body 27 which is formed into a shape of a cylinder having a bottom and fixed within a valve hole 26 formed inside the cylinder head. Solenoid 28 is fixed with an outer end section of valve body 27 serving as a single member. Spool valve body 29 is disposed within valve body 27 to be freely slidable.

Above valve body 27 is formed with supplying port 30 which is located at a generally central section in an axial direction thereby accomplishing communication between supplying passage 21 and an inside of valve body 27. First and second ports 31, 32 are respectively formed at opposite sides of supplying port 30 in the axial direction of valve body 27 and extend along an outer peripheral surface in a radial direction of valve body 27. The first and second ports 31, 32 respectively accomplish communications between an end section of the above first oil passage 19 and the inside of valve body 27 and that between an end section of second oil passage 20 and the inside of valve body 27. First and second drain ports 33, 34 are respectively formed at outsides of both first and second ports 31, 32 thereby accomplishing communication between the inside of valve body 27 and drain passage 22.

Above solenoid 28 includes electromagnetic coil 28b disposed inside solenoid casing 28a. Fixed core 28c is energized upon applying electric current to electromagnetic coil 28b. Movable plunger 28d is slidably moved upon energizing fixed core 28c thereby pushing and displacing above spool valve body 29. A control current from electronic controller 36 to above electromagnetic coil 28b is applied or cut through a wire harness (not shown).

Spool valve body 29 includes first land portion 29a which is located at a generally center of spool valve body 29 and operated to open and close above supplying port 30 in accordance with a sliding position of spool valve body 29 in an axial direction. Second and third land portions 29b, 29c are respectively provided at opposite sides of first land portion 29a thereby relatively opening and closing between above first and second ports 31, 32 and drain ports 33, 34. Return spring 35 is springingly disposed between flange shaped spring retainer 29d provided at a one end of spool valve body 29 and an annular-shaped retainer integrally formed at the inside of valve body 27. Spool valve body 27 is biased under a biasing force of return spring 35 in a right-most position in the axial direction as shown in FIGS. 1 and 5 thereby accomplishing communication between supplying port 30 and second port 32, and that between first port 31 and drain port 33. On the other hand, spool valve body 27 is movably controlled against the spring force of return spring 35 under the control current from above electronic controller 36 in a left-most position in the axial direction or a predetermined central position.

Above supplying port 30 is set to have opening cross-sectional area S1 (formed in a relative relationship between supplying port 30 and first land portion 29a of above spool valve body 29) which is larger than minimum passage cross-sectional area S which is formed at a part of above supplying passage 21. Above first and second ports 31, 32 are set to have opening cross-sectional area S2 which is generally equal to opening cross-sectional area S1 of above supplying port 30. Each passage port 19a, 20a of above first and second oil passages 19, 20 are set to have passage cross-sectional area S3 which is generally equal to opening cross-sectional area S2 of above first and second ports 31, 32.

Total passage cross-sectional areas of above branching passages 19b, 20b are respectively a sum of the cross-sectional area of above four branching passages 19b and that of above four branching passages 20b. The total passage cross-sectional area of each branching passage 19b, 20b is set to be larger than opening cross-sectional area S2 of corresponding first port 31 or second port 32.

Additionally, the cross-sectional area of above supplying port 30 is set slightly larger than the opening cross-sectional area of supplying port of the flowing passage change-over valve in the conventional technique which has been described above.

Although the sizes of opening cross-sectional areas of above first and second drain ports 33, 34 and a passage cross-sectional area of drain passage 22 are set generally equal to that in the conventional technique in order to prevent generation of a cavitation or the like, for example, in timing-advancing chamber 17 and timing-retarding chamber 18, the sizes may be formed larger in accordance with models and specifications.

Above electronic controller 36 detects an operating condition at the present time in accordance with signals from a crank-angle sensor (not shown) for detecting an engine speed and from an airflow meter (not shown) for detecting an intake air amount and various sensors such as a throttle valve opening-degree sensor, a water temperature sensor for detecting a coolant temperature in the engine or the like.

Above electronic controller 36 outputs or stops output of the control current to above flowing passage change-over valve 23 in accordance with the above engine operating condition thereby controlling a change-over operation. Additionally, at an engine starting, electronic controller 36 outputs the control current to above flowing passage change-over valve 23, for example, after about three seconds from a time when an ignition key is operated to be switched ON, thereby accomplishing a change-over control.

In other words, electronic controller 36 does not apply an electric current to above electromagnetic coil 28b until a timing when, for example, three seconds lapse from an engine starting initial period when the ignition key is operated to be switched ON, so that spool valve body 29 is retained to the right-most position in the axial direction under the biasing force of return spring 35. Additionally, electronic controller 36 applies the electric current to electromagnetic coil 28b after about three seconds lapse from the engine starting initial period when the ignition key is operated to be switched ON, to move above spool valve body 29 in the axial direction, thereby carrying out a normal control (for example, a timing-advancing control) for the above phase changing mechanism. In this embodiment, the timing of operation starting for above flowing passage change-over valve 23 is set at the timing when about three seconds lapse from the ignition key operation of being switched ON. The about three seconds are decided taking account of a viscosity of the hydraulic oil in a common stoppage time of the engine of the vehicle, and may change in accordance with the models of flowing passage change-over valve 23 or a property of the hydraulic oil.

Restriction mechanism 37 is provided between above widest vane 15 and housing 5 to restrict rotation of vane member 3 to housing 5 or release restriction between widest vane 15 and housing 5.

Figure 4:
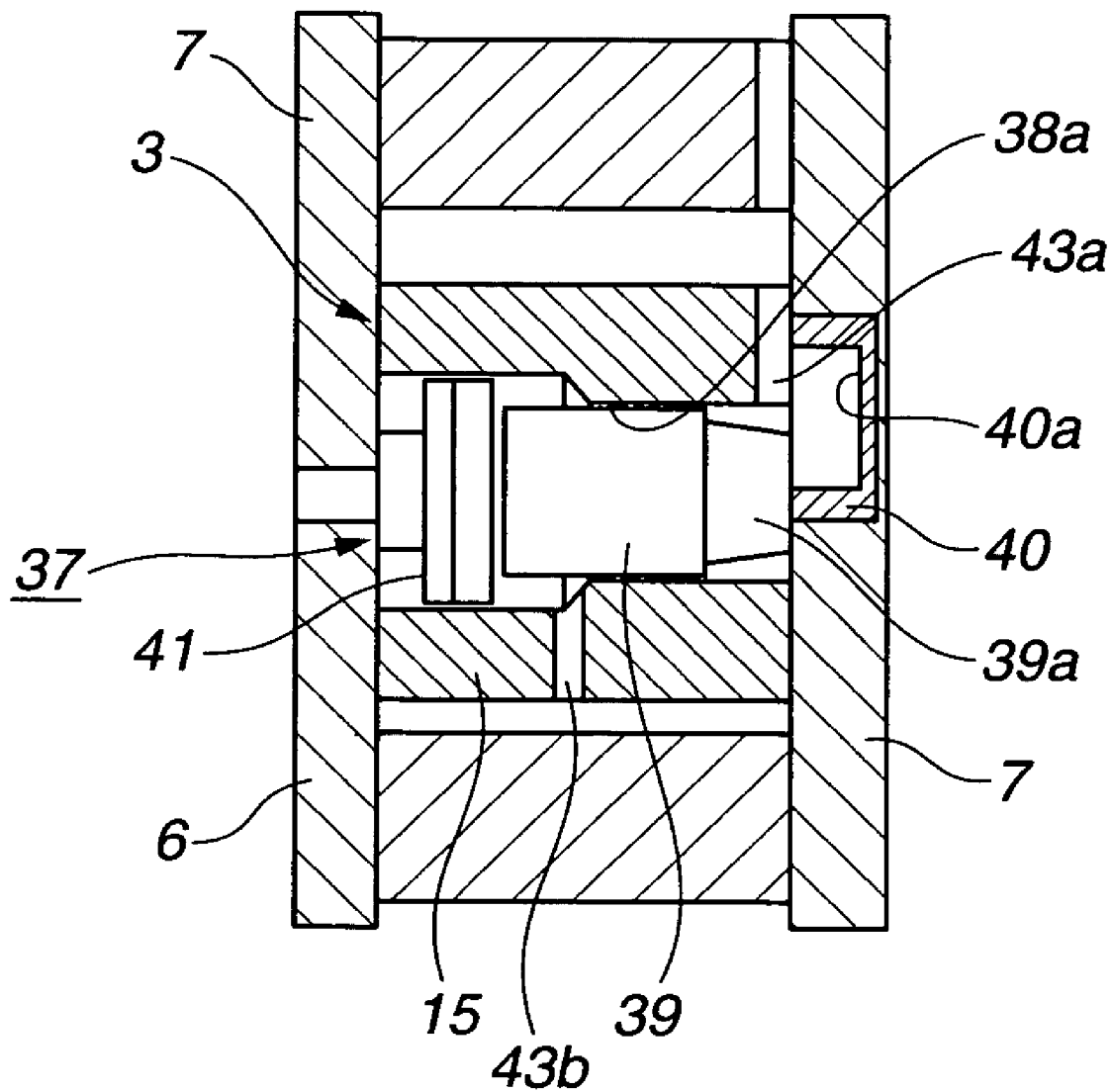
FIG. 4 is a cross-sectional view of a part of the VTC system of FIG. 1, showing a restriction mechanism.

As shown in FIGS. 1 and 4, restriction mechanism 37 is provided between above widest vane 15 and rear cover 7 and includes sliding hole 38 formed in above vane 15 and extending along the axial direction of cam shaft 2. A lock pin 39 formed into a shape of a cylinder having a lid portion is slidably provided in sliding hole 38. Above rear cover 7 is formed with a fixing hole to which engagement-hole forming portion 40 having a cup-shape cross-section is fixed. Engagement hole forming portion 40 formed thereinside with engagement hole 40a to which taper-shaped tip end section 39a of above lock pin 39 is engaged and disengaged. Spring member 42 is retained by spring retainer 41 fixed to a bottom side of above sliding hole 38 to bias lock pin 39 in a direction of engagement hole 40a.

Tip end section 39a is engaged with engagement hole 40a under a biasing force of above spring member 42 at a position where above vane member 3 is rotated to a most-retarded side (at which a valve timing is most retarded) so that above lock pin 39 locks a relative rotation between timing sprocket 1 and cam shaft 2. A hydraulic pressure within above timing-advancing chamber 17 and timing-retarding chamber 18 is supplied into the inside of above engagement hole 40a and into between a stepwise portion of lock pin 39 and sliding hole 38 through oil holes 43a and 43b. Above lock pin 39 is moved rearward by the hydraulic pressure as shown in FIG. 4 thereby being released from engagement to engagement hole 40a.

Above spring member 42 functions as a restriction maintaining mechanism. The biasing force of the spring member is set such that the spring member cannot make its large compression-deformation under a pressure of air accumulated within above each timing-retarding chamber 18 at the starting of the engine and compressed by a hydraulic pressure fed from oil pump 25.

Hereinafter, discussion will be made on an operation of this embodiment. Firstly, during engine stopping, oil pump 25 is stopped to operate thereby stopping supplying of the hydraulic pressure to each timing-advancing chamber 17 and each timing-retarding chamber 18. Additionally, vane member 3 is rotated in a direction opposite to a rotational direction of cam shaft 2 (or a direction indicated by an arrow) by a so-called alternating torque generated in cam shaft 2 immediately after engine stopping so that vane member 3 is located at the most retarded side.

At this time, tip end section 39a of lock pin 39 is engaged with engagement hole 40a under the biasing force of return spring 42 so that lock pin 39 of above restriction mechanism 37 restricts a free rotation of vane member 3.

Additionally, since electronic controller 36 is prevented from supplying the electric current to flowing passage change-over valve 23, spool valve body 29 is biased under the biasing force of return spring 35 to the right-most position as shown in FIG. 5.

Next, the ignition key is operated to be switched ON thereby starting the engine and a cranking. During three seconds after the starting of the cranking, the control current is not output from electronic controller 36 to above electromagnetic coil 28b. Therefore, spool valve body 29 is in a state to be biased in the right-most position under the biasing force of return spring 35 so that first land portion 29a opens supplying port 30, and third land portion 29c opens second port 32 and closes second drain port 34. Simultaneously, second land portion 29b accomplishes communication between first port 31 and first drain port 33.

Consequently, the hydraulic pressure discharged from oil pump 25 is flowed from supplying passage 21 through supplying port 30 into valve body 27. Then, the hydraulic pressure is flowed from second port 32 into second oil passage 20, and supplied through each second branching passage 20b to each timing retarding chamber 18. As a result, vane member 3 is maintained in the state to be located at the most-retarded side by a low hydraulic pressure supplied within above each timing-retarding chamber 18. By this, an engine starting ability is improved.

At this time, the air accumulated within each timing-retarding chamber 18 is pressurized by the above low hydraulic pressure thereby pushing vane member 3 to the most-retarded side together with the low hydraulic pressure.

On the other hand, lock pin 39 is in a state to maintain the engagement with engagement hole 40a under the biasing force of spring member 42 since the internal pressure in timing-retarding chamber 18 has not sufficiently risen. Consequently, vane member 3 is restrained from generation of a flapping in right and reverse directions by the alternating torque acting to cam shaft 2.

Figure 6:
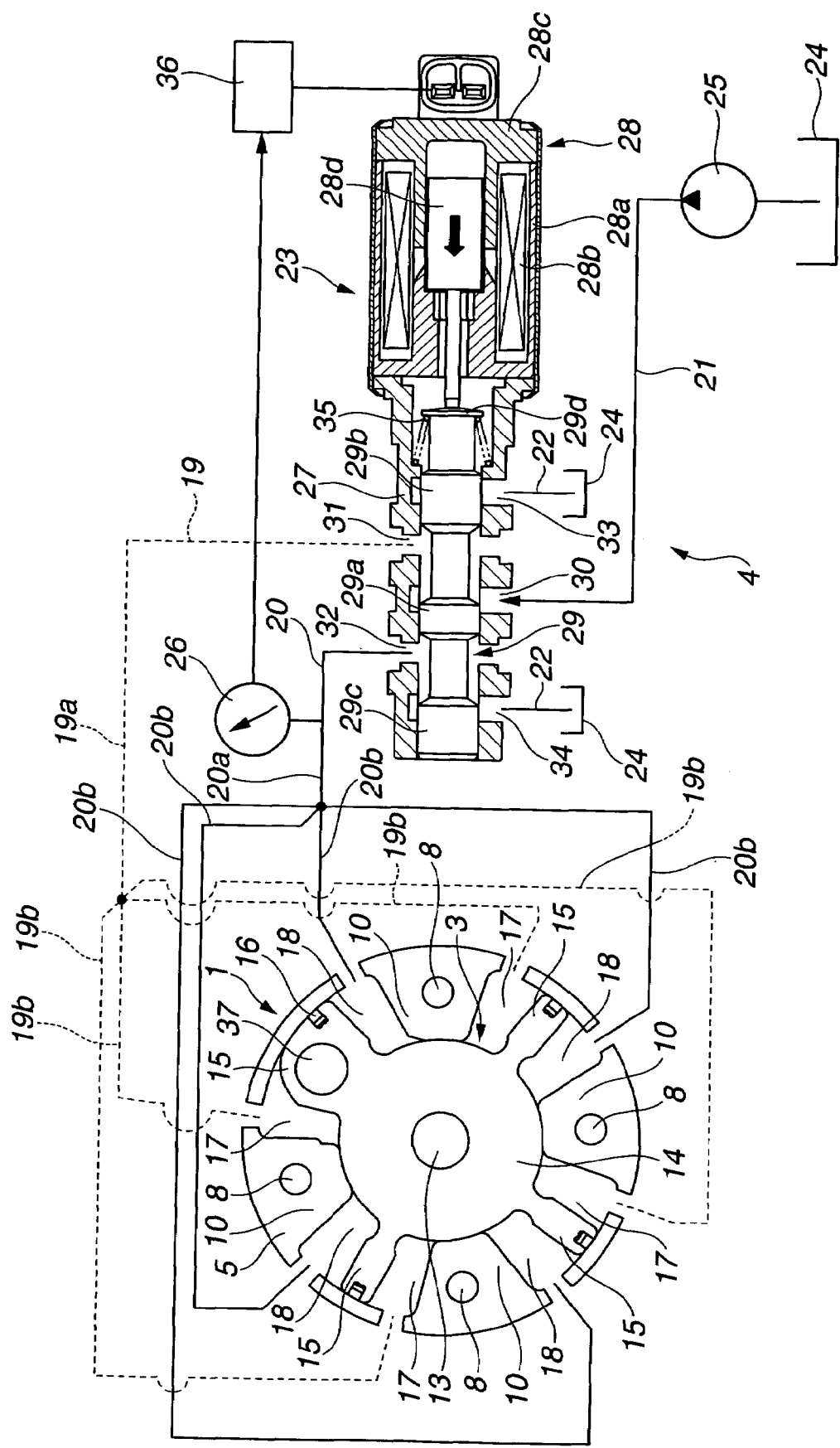
FIG. 6 is a schematic illustration showing another operational state of the flowing passage change-over valve of FIG. 1.

Thereafter, after about three seconds starting the cranking upon the above ignition key being switched ON, electric current is applied from electronic controller 36 to electromagnetic coil 23b of flowing passage change-over valve 23 thereby energizing fixed core 28c. By this, spool valve body 29 is gradually moved leftward from the position shown in FIG. 5 through movable plunger 28d thereby cutting the communication between first port 31 and first drain ports 33, while accomplishing communication between supplying port 30 and first port 31 as shown in FIG. 6. Simultaneously, a communication between second port 32 and second drain port 34 is accomplished.

Consequently, the discharge pressure of oil pump 25 is flowed from supplying passage 21 into supplying port 30 and valve body 27, and then flowed from first port 31 into first passage part 19a of first oil passage 19. Thereafter, the discharge pressure is supplied through each branching passage 19b to each timing-advancing chamber 17 to make the inside of chamber 17 high in pressure, while the hydraulic oil within each timing-retarding chamber 18 is returned through second oil passage 20 or the like into oil pan 24 thereby making the inside of chamber 18 low in pressure.

Therefore, lock pin-39 is pulled out of engagement-hole 40a as shown in FIG. 4 with a rising of the hydraulic pressure in above each timing-advancing chamber 17 thereby releasing a lock state of vane member 3. This allows vane member 3 to freely rotate, and simultaneously vane member 3 is rotated rightward in the figure from a position shown in FIG. 2. In other words, vane member 3 is rotated in a direction same as the rotational direction of cam shaft 2 thereby immediately changing the relative rotational phase between the crankshaft and cam shaft 2 to a timing-advancing side.

As a result, a valve overlap between the intake valve and the exhaust valve becomes slightly larger thereby making it possible to decrease an amount of emission of HC (hydrocarbons) in exhaust gas under the effect of a so-called internal EGR as described below.

Figure 3:
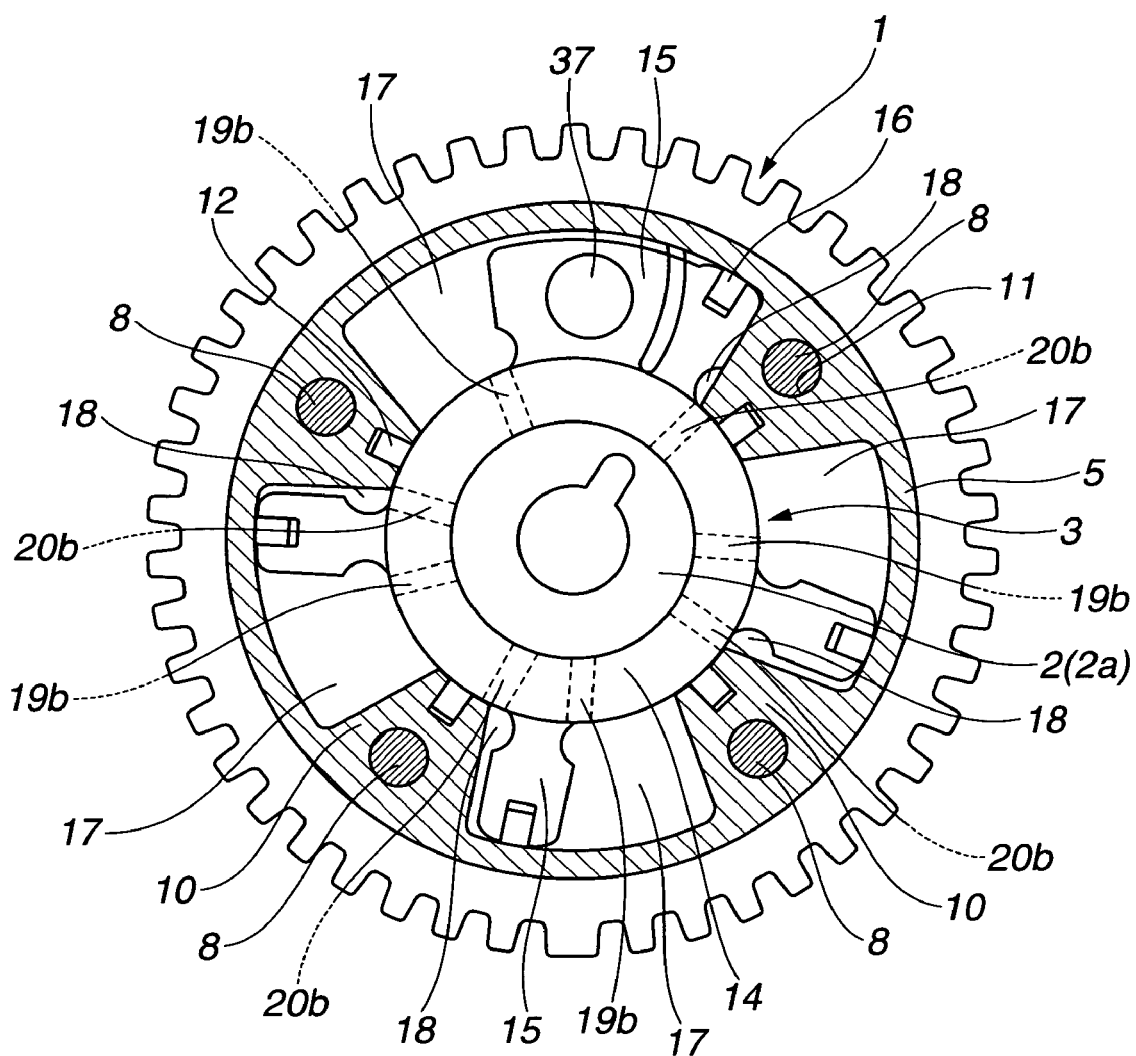
FIG. 3 is a cross-sectional view of the valve timing control system of FIG. 1, showing a state where a vane member is at a rotational position in a most timing-advancing side.

Furthermore, in case that the engine makes a transition from a low engine speed region to a middle engine speed region as a steady operation, the electric current is maintained to be supplied from electronic controller 36 to electromagnetic coil 28b so that the hydraulic pressure is continuously supplied to each timing-advancing chamber 17. By this, vane member 3 is further rotated in the same direction and maintained at a maximum rotational position as shown in FIG. 3 so that the relative rotational phase between the crankshaft and cam shaft 2 is changed to a most-advanced side (at which the valve timing is most advanced). As a result, the valve overlap becomes larger thereby increasing an engine power output.

Figure 7:
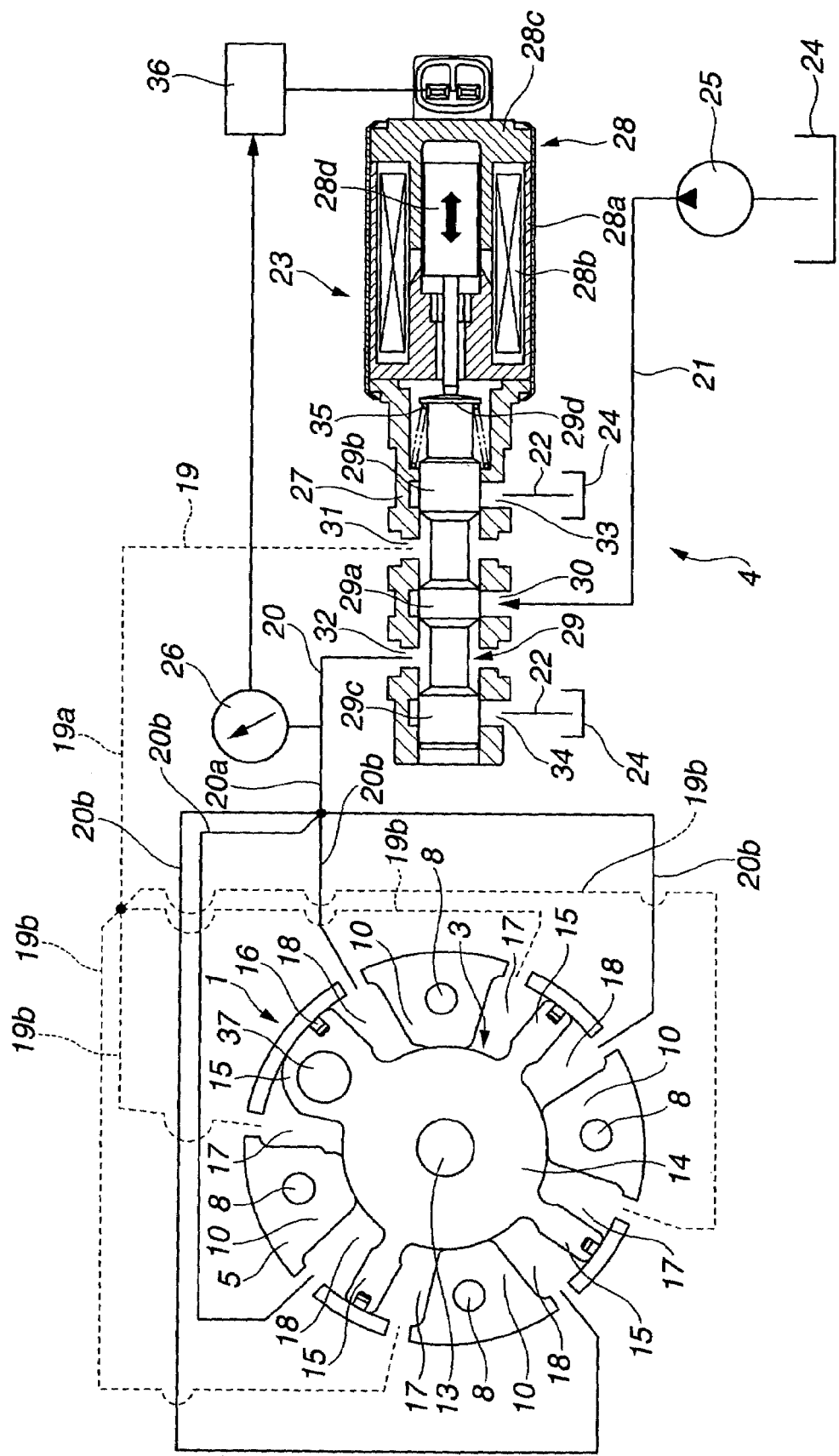
FIG. 7 is a schematic illustration showing a further operational state of the flowing passage change-over valve of FIG. 1.

Additionally, above spool valve body 29 is retained at a neutral position as shown in FIG. 7 upon controlling the electric current supplied from electronic controller 36 to flowing passage change-over valve 23 so as to cut the communication between supplying port 30 and first and second ports 31, 32 and that between first and second ports 31, 32 and drain ports 33, 34 thereby making it possible to retain vane member 3 at a certain rotational position.

In this embodiment, the opening and closing timings of the intake valve is changed in accordance with the engine operating condition thereby making it possible that the engine can exhibit a sufficient engine performance as discussed above. Additionally, particularly in the early-engine starting stage (or a cranking initial stage), the electronic controller does not supply current to flowing passage change-over valve 23 so that the hydraulic pressure is supplied to each timing-retarding chamber 18 though the supplied hydraulic pressure is low. Therefore, vane member 3 is not effected by the alternating torque generated in cam shaft 2 so that the crankshaft and cam shaft 2 can maintain the relative rotational phase to the timing-retarding side which is suited for the engine starting.

Additionally, at the engine starting initial stage, lock pin 39 of restriction mechanism 37 can be prevented from an accidental engagement-releasing from engagement hole 40a by an air pressure or the like, under the relatively large biasing of spring member 42. Consequently, it is possible to solve the problem that the apparatus or system is abnormally operated upon the accidental engagement-releasing by the above air pressure thereby generating foreign sound.

Furthermore, flowing passage change-over valve 23 is controlled by electronic controller 36 in such a manner that the phase changing mechanism is immediately to be operated after about three seconds from the starting of the cranking. Consequently, it is possible to accomplish the control for the relative rotational phase between the crankshaft and cam shaft 2 since the initial stage during the starting of the engine.

Particularly in this embodiment, the opening cross-sectional areas of above supplying port 30 and first port 31 and the passage cross-sectional area of first oil passage 19 are formed sufficiently larger thereby sufficiently decreasing a flowing passage resistance of the hydraulic fluid discharged from oil pump 25 in flowing passage change-over valve 23 and in the whole first oil passage 19 including first passage part 19a and each branching passage 19b, and therefore a smooth flow can be obtained.

Figure 8:
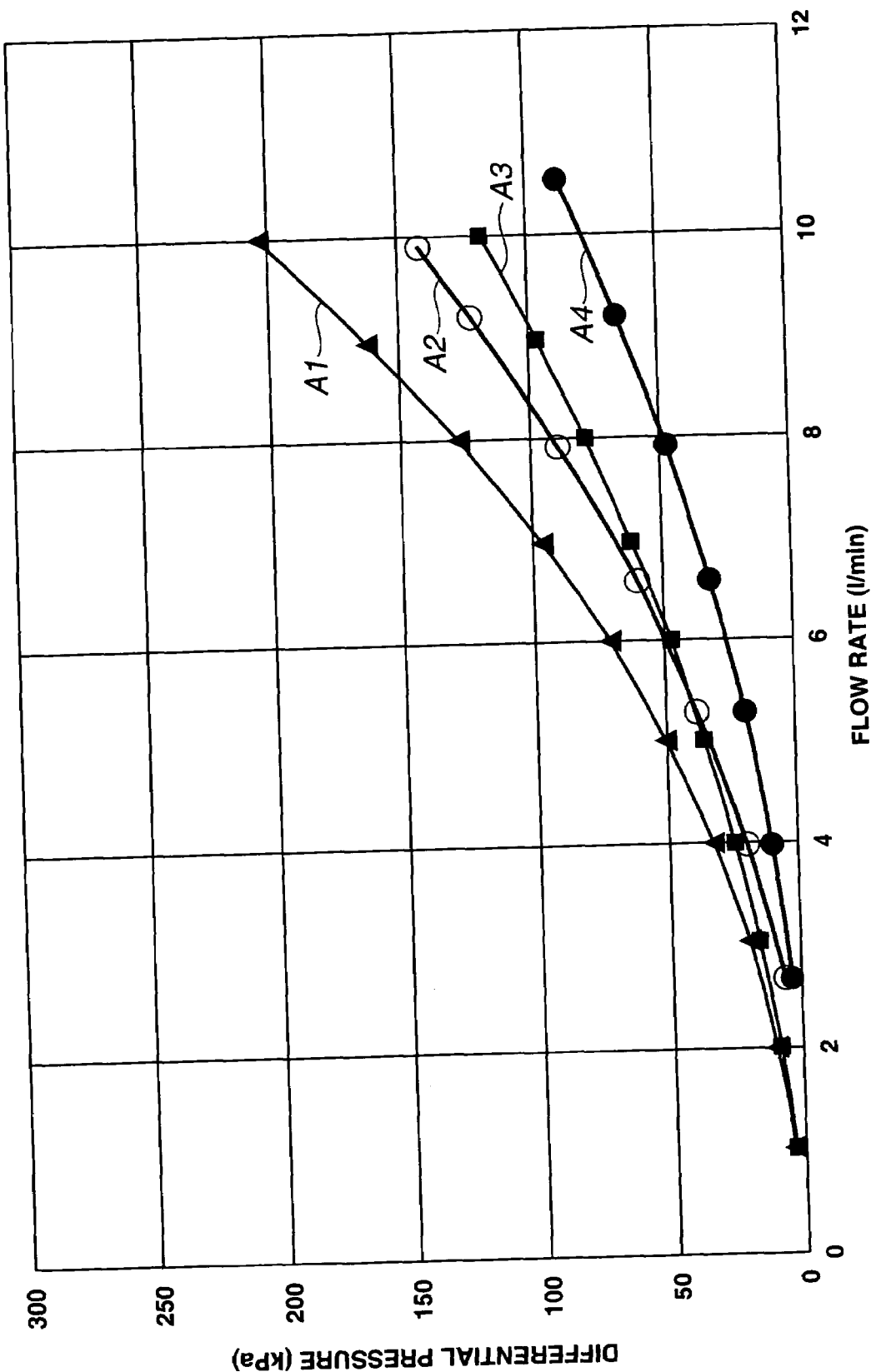
FIG. 8 is a graph showing a relationship between a flow rate and a flowing passage resistance (or differential pressure) of a supplied hydraulic fluid in the VTC system.

FIG. 8 indicates a relationship between a pressure drop (or differential pressure) as the flowing passage resistance and a flow rate of the hydraulic fluid in the VTC. Firstly, a comparison is made between above supplying passage 21 and first oil passage 19 in which the passage cross-sectional area is set larger. For example, in case that the flow rate is 0 to 10 l/min, the differential pressure (indicated by a line A1) in above supplying passage 21 takes a high value such as 0 to about 200 kPa (maximum). While, the differential pressure (indicated by a line A3) in first oil passage 19 takes a sufficient low value such as 0 to about 120 kPa (maximum).

Additionally, a comparison is made between the above flowing passage change-over valve in the conventional technique and that in this embodiment, in the relationship between the differential pressure and the flow rate in respective ports. In the flowing passage change-over valve in the conventional technique in which the opening cross-sectional area of the port is relatively small, the differential pressure rises to 150 kPa at maximum value in the flow rate range of 0 to 10 l/min as represented by a line A2. On the other hand, in the flowing passage change-over valve in this embodiment, the differential pressure takes about 70 to 80 kPa at maximum as represented by a line A4 thereby showing that the differential pressure is sufficiently decreased. Additionally, in this embodiment, it is apparent that the flow rate is increased to 12 l/min in case that the differential pressure becomes around about 80 kPa.

This results from the fact that the openings of above supplying port 30 and first oil passage 19 and passage cross-sectional areas of S1 to S3 are set larger than passage cross-sectional area S of supplying passage 21.

Therefore, in this embodiment, a rising speed of the hydraulic pressure at the starting of the change-over operation for the above flowing passage change-over valve and each timing-advancing chamber 17 becomes high thereby raising a rotational speed of vane member 3 in a timing-advancing direction. As a result, it is possible to effectively suppress an emission amount of hydrocarbons (HC) which tend to be easily generated in exhaust gas at the engine starting.

Figure 9:
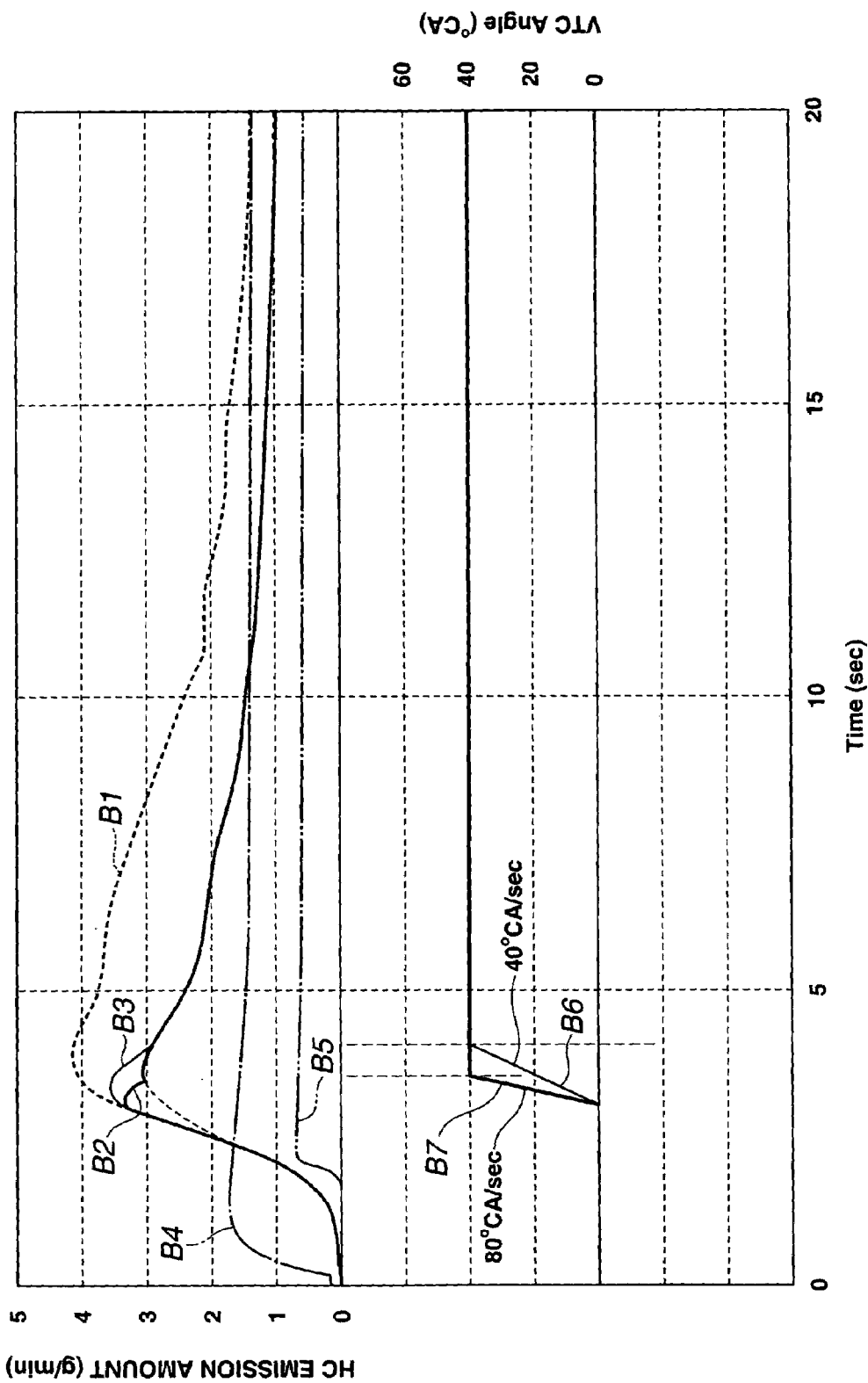
FIG. 9 is a graph showing HC emission amount characteristics in connection with the VTC according to the embodiment and other VTC systems.

FIG. 9 shows a characteristic of the HC emission amount at the engine starting. In FIG. 9, waveforms in an upper side indicate a relationship between a lapse of time (sec) and the HC emission amount at the engine starting. A line B1 indicates a HC emission amount in an engine which is not provided with the VTC. A line B2 indicates a HC emission amount in the engine provided with the VTC in which the opening areas of respective ports 31, 32 and first oil passage 19 are formed larger, as in this embodiment. A line B3 indicates a HC emission amount in the engine provided with the VTC in the above conventional technique in which the opening areas of each port or the like are set generally same as the passage cross-sectional area of the main oil gallery. A line B4 indicates the engine speed. A line B5 indicates the hydraulic pressure.

In FIG. 9, wave forms in a lower side show a lapse of time from the starting of the operation of each VTC in order that a valve timing advance rises from 0° CA (crank angle) to 40° CA. A line B7 indicates a VTC in this embodiment in which the opening cross-sectional area of each port is set larger. A line B6 indicates a VTC in the conventional technique in which the opening cross-sectional area of each port is not changed.

As shown in this diagram (in the lower side), flowing passage change-over valve 23 is operated to make a change over operation after about three seconds from switching the ignition key ON so as to accomplish the communication between supplying port 30 and first port 31. In this case, it will be understood that vane member 3 in the conventional technique (represented by the line B6) is slowly rotated for about a second since vane member 3 is started to operate. In other words, the rotational speed of vane member 3 becomes 40° CA/sec.

On the other hand, in this embodiment (represented by the line B2), it is obvious that vane member 3 is completely operated for 0.4 to 0.5 seconds since vane member 3 is started to operate, so as to rotate at a speed of about 80° CA/sec which is two times the rotational speed of vane member 3 in the conventional technique.

Therefore, as shown in the diagram in the upper side in FIG. 9, the HC emission amount becomes not less than 4 g/min in the engine which is not provided with the VTC (represented by the line B1) immediately after the engine starting. Thereafter, the HC emission amount tends to gradually decrease maintaining relatively large amounts until about 20 seconds after. Furthermore, in case of the VTC having the port opening in which the cross-sectional is as in the conventional technique (represented by the line B3), the HC emission amount is abruptly increased to about 3.5 g/min since a time immediately after engine starting until the VTC is completely operated. However, it is apparent that when the operation of the VTC is started, the HC emission amount is abruptly decreased, and then gradually decreased maintaining relatively small amounts until about 20 seconds after.

In contrast, in case of this embodiment (represented by the line B2), the HC emission amount is abruptly increased to about 3.2 g/min since a time the immediately after engine starting until the VTC is completely operated, because the starting time for the operation of the VTC is extremely shortened as discussed above. However, the HC emission amount in this embodiment is abruptly decreased since the operation of the VTC is started, and then tends to further decrease as compared with that in the VTC in the conventional technique (represented by the line B3). Thereafter, the HC emission amount is gradually decreased until about 20 seconds after as same as in the conventional technique.

As discussed above, in this embodiment, opening cross-sectional areas S1, S2 of respective ports 30, 31 and the passage cross-sectional area of first oil passage 19 are set larger thereby lowering the flowing passage resistance. Therefore, the hydraulic pressure is rapidly supplied to each timing-advancing chamber 17 so that the relative rotational phase between the crankshaft and cam shaft 2 can be changed to the timing-advancing side through vane member 3 at a high response. As a result, it is apparent that the HC emission amount in exhaust gas at the engine starting is largely decreased.

In the operation of this embodiment, discussion has been made on the control for the timing-advancing side in the VTC. However, the cross-sectional area of second port 32 and the passage cross-sectional area of second oil passage 20 are set larger, and therefore the operational response in the control from the timing-advancing side to the timing-retarding side is also apparently improved.

Figure 10:
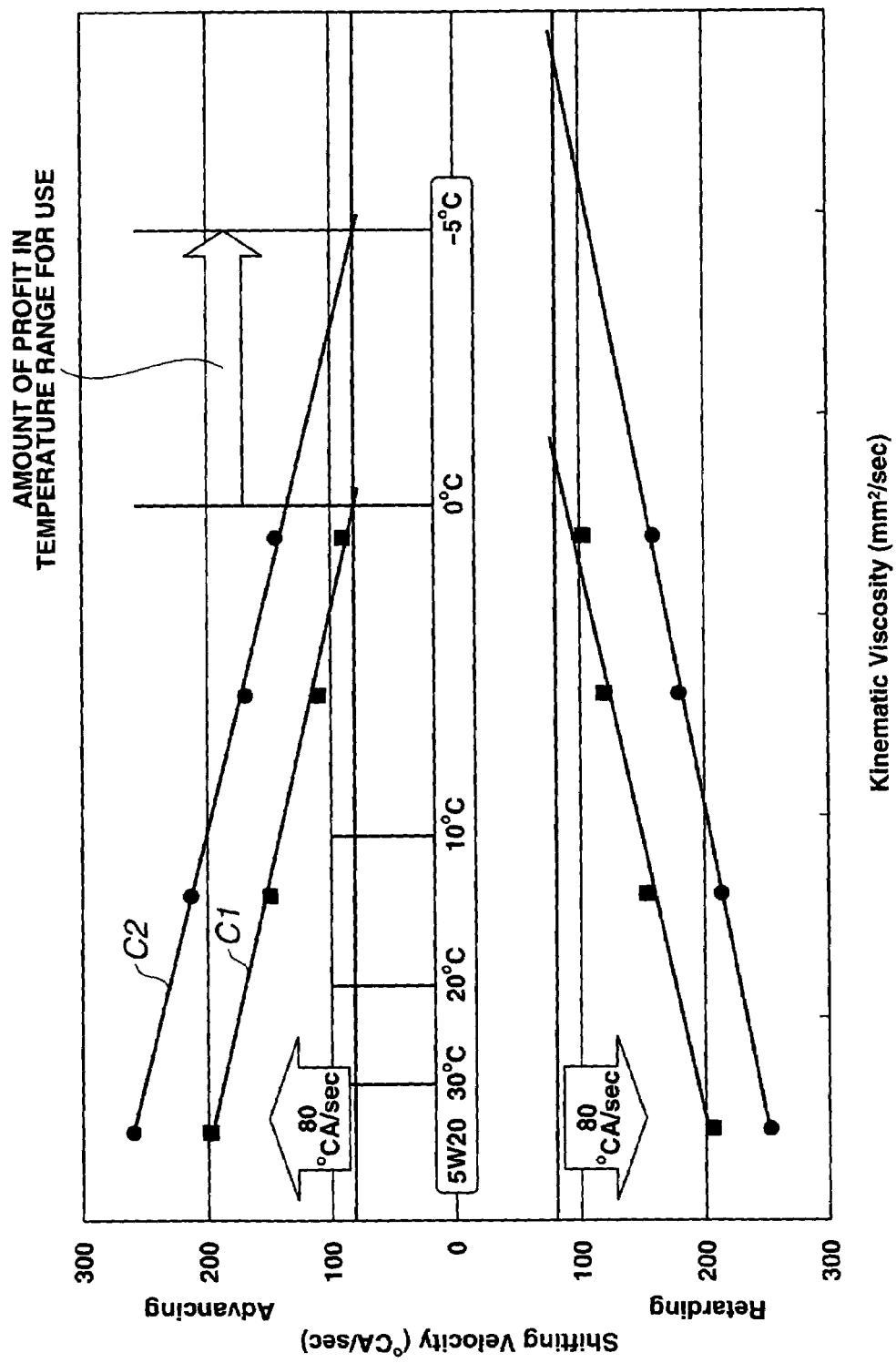
FIG. 10 is a graph showing a relationship between viscosity of the hydraulic fluid and operational response of the VTC system.

Additionally, the operational response of the above VTC is largely affected also by the viscosity of the hydraulic oil (lubricating oil) fed from oil pump 25 under pressure. FIG. 10 is a graph showing experimental results which indicate relationships between the viscosity of the hydraulic fluid and the operational response, in the VTC in the conventional technique (in which the opening cross-sectional area of each port is not increased) and that in this embodiment. Here, in this experiment obtaining the experimental results, the hydraulic fluid has a viscosity is SAE (Society of Automotive Engineers) "5W20" as commonly used, and the engine speed is set at 1,000 rpm.

As apparent from this graph, in case that vane member 3 is rotationally controlled, for example, to the timing-advancing side, the speed of the operational response (or shifting velocity) in the VTC in the conventional technique (represented by a line C1) changes from 80° CA/sec to 200° CA/sec when an oil temperature changes from 0° C. at which the viscosity is high to about 30° C. at which the viscosity is low.

In contrast, in the VTC of this embodiment (represented by a line C2), the speed of the operational response is 80° CA/sec at the oil temperature of −5° C. When the oil temperature rises to 30° C., it is apparent that the speed of the operational response is improved to about 260° CA/sec so that an improved rate of the speed of the operational response speed to that in the VTC in the conventional technique is about 46%. This results from the fact that the opening cross-sectional areas of respective ports 30, 31 and the passage cross-sectional area of first oil passage 19 are respectively set larger.

In this embodiment, it is apparent that also improved in the speed of the operational response is improved also in the timing-retarding side, similarly in relation to the viscosity same as shown in the lower side in FIG. 10 where like lines represent like cases in the upper side in FIG. 10.

Additionally, in this embodiment, the opening cross-sectional areas of respective ports 30, 31 and the passage cross-sectional area of first oil passage 19 are respectively set larger so that an amount of profit in temperature range for using the hydraulic oil is extended from 0° C. to −5°. As a result, it is possible to use the hydraulic oil (or lubricating oil) in a cold district where temperature is relatively low.

In other words, a good operation is ensured in this embodiment in a low temperature district as compared with the VTC in the conventional technique even in case where the same hydraulic oil is used. As a result, it is possible to ensure a high operational response speed and to extend the operational region of the VTC.

As discussed above, an engine oil (or lubricating oil) has a property that the viscosity is higher as temperature is lower. In a normal condition, the control for the VTC is started after a certain time, for example three seconds, since the ignition key being switched ON. In a condition where temperature is low, an oil temperature or an engine coolant temperature is monitored until the oil temperature reaches a lower at which an oil viscosity is such level that a certain oil flow amount is obtained. The above control for the VTC is started at a time when the temperature becomes a level, for example, not lower than 25° C. Starting the control after three seconds since the ignition key being switched ON results from the fact that if pipings between the oil pump and the VTC and VTC actuators are not filled with oil, the normal operation of the VTC actuators as hydraulic actuators cannot be guaranteed.

The hydraulic circuit of the VTC is configured as discussed above so that it is possible to realize secure operation of the VTC actuators also in the condition where the engine is low in temperature. Therefore, a temperature at which the control is started can be set lower than that in the conventional technique so that the VTC is operated as quickly as possible even if an exhaust gas purifying catalyst is in a low temperature state where the catalyst is inactive, thereby making it possible to decrease the HC in the exhaust gas. In view of this, the electric current is supplied to solenoid 28 (electromagnetic coil 28b) of flowing passage change-over valve 23 in a logic described below thereby making it possible to promote the timing for starting the control.

The lubricating oil is flowed from the side of valve body 27 to an area surrounding movable plunger 28d located inside above electromagnetic coil 28b during the operation, so that an opening end of fixed core 28c located at the side of valve body 27 is formed to be communicated with the inside of valve body 27 so as to lubricate a sliding section between movable plunger 28d and fixed core 28c.

The lubricating oil flowed in the front and rear sections of movable plunger 28d can be moved through an axial groove formed at an outer peripheral surface of movable plunger 28d and an axial hole formed inside movable plunger 28d. Therefore, the lubricating oil is able to be moved in accordance with a displacement of movable plunger 28d in the axial direction thereby providing smooth displacement of movable plunger 28d.

However, in case that the lubricating oil flowed to around movable plunger 28d is high in viscosity, movable plunger 28d is prevented from being smoothly moved under a high viscosity resistance.

Figure 11:
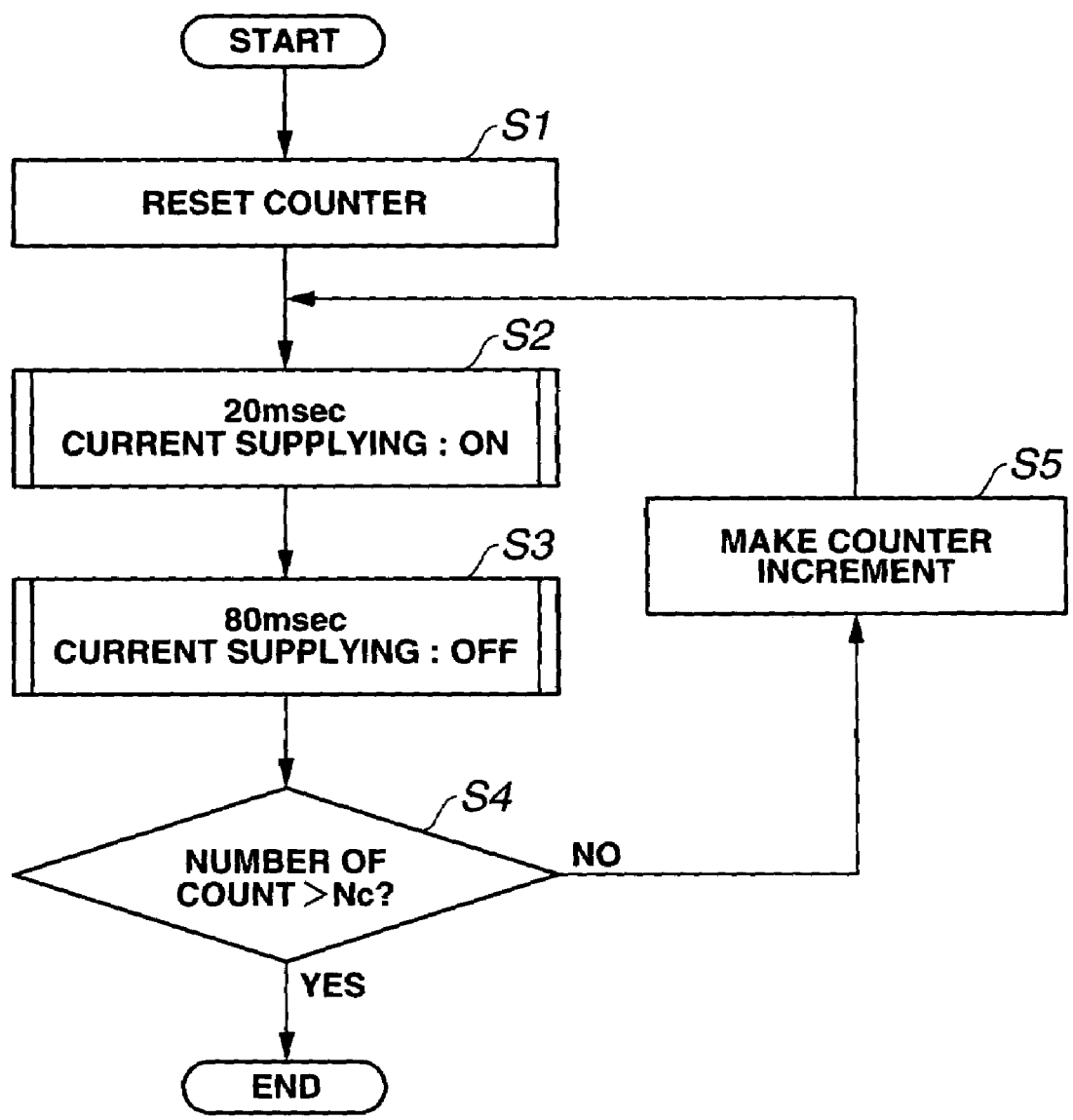
FIG. 11 is a flowchart for controlling discharging of remained oil in a flow passage change-over valve of the VTC system.

Consequently, above electronic controller 36 carries out a control shown in a flowchart in FIG. 11 thereby discharging the lubricating oil flowed in the front and rear sections of movable plunger 28d.

At a step S1, a timer counter is reset at an initial value (0) when the discharge pressure of oil pump 25 is lowered after the ignition key is switched OFF. Thereafter, at a step S2, electric current is supplied to electromagnetic coil 28b for only 20 msec. Next, at a step S3, supplying electric current to electromagnetic coil 28b is stopped for only 80 msec.

At a step S4, judgment is made whether or not a current count number counted by the above counter is larger than a certain count number Nc. In case that the judgment is made as the current count number is larger than the certain count number Nc, a pumping due to a repeated displacements of movable plunger 28d in the axial direction has been carried out thereby finishing such a process. However, in case that the judgment is made such that the current count number is smaller than the certain count number Nc, a flow goes to a step S5 to make a counter increment, and then returns to the step S2 to repeatedly an ON-OFF control for the current supplying once again.

As discussed above, the ON-OFF control for the current supplying control for electromagnetic coil 28b is temporarily carried out so that the pumping is carried out upon displacing movable plunger 28d in the axial direction (left and right directions in the figure) by a few times. Consequently, the lubricating oil accumulated in the front and rear sections relative to movable plunger 28d is discharged out through first drain port 33 thereby replacing the lubricating oil with air. By this, the viscosity resistance of the lubricating oil around movable plunger 28d is decreased thereby making it possible to smoothly displacing movable plunger 28d in the axial direction. It is possible to freely set a current supplying period or a current interrupting period of the ON-OFF control to above electromagnetic coil 28b.

Flowing passage change-over valve 23 is disposed in a housing within the engine or a housing installed to the engine and immersed in the lubricating oil discharged from oil pump 25. On the other hand, solenoid 28 is located usually at a position exposed to outside air. Therefore, temperature rising of solenoid 28 (or electromagnetic coil 28b) is delayed relative to a heat-up at the engine starting.

Figure 12:
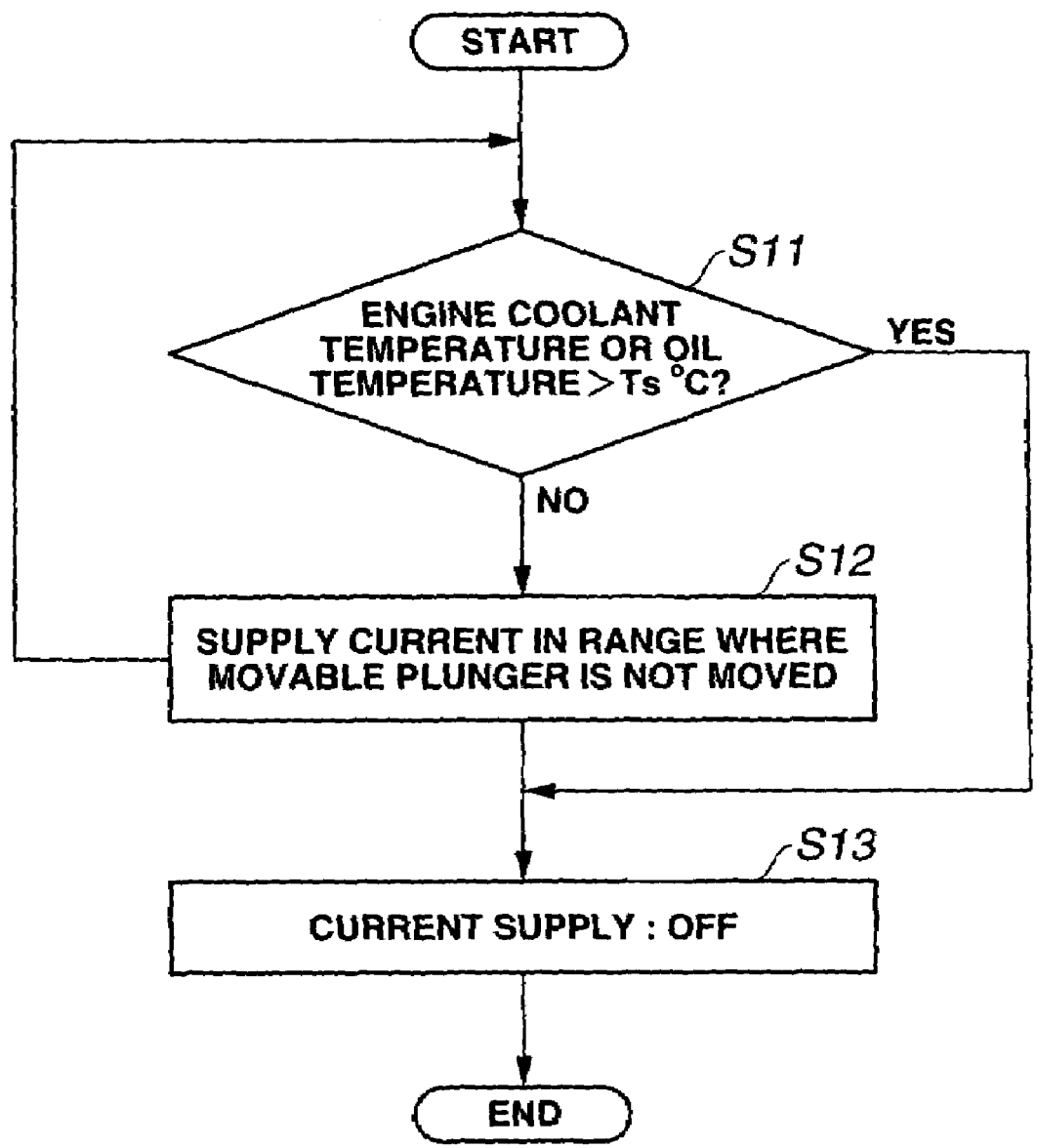
FIG. 12 is a flowchart for controlling a temperature rising in an electromagnetic coil of the VTC system.

Therefore, it is possible to compulsorily raise the speed of the temperature rising in electromagnetic coil 28b upon carrying out a control shown in a flowchart in FIG. 12 by using electronic controller 36.

At a step S11, judgment is made as to whether or not the current engine coolant temperature or current oil temperature in the engine is higher than a predetermined temperature Ts ° C. in accordance with an information signal previously output from a coolant temperature sensor or an oil temperature sensor immediately after the ignition key is switched ON.

Here, the judgment is made such that the current engine coolant temperature or current oil temperature in the engine is higher than the predetermined temperature Ts ° C., a flow goes to a step S12 so that a slight amount of electric current is supplied to electromagnetic coil 28b. This amount of electric current has a magnitude that movable plunger 28d cannot move upon overcoming the biasing force of spring 35 under applying a duty ratio from electronic controller 36.

Thereafter, the flow goes from the step S12 to a step S11 to make a judgment once again as to whether or not the temperature rising has been accomplished. In case that the judgment is made such that the temperature rising has been accomplished, the current supplying to electromagnetic coil 28b is cut off at a step S13. By this, temperature in electromagnetic coil 28b is compulsorily raised by the electric current supplied from electronic controller 36.

As a result, a temperature around movable plunger 28d becomes high thereby making it possible to effectively decrease the viscosity of the lubricating oil flowed around movable plunger 28d. Consequently, movable plunger 28d is rapidly displaced upon subsequent supplying of the electric current.

It is possible to start the control for the VTC three seconds later as discussed above upon cutting off the current supplying at the above step S13.

Figure 13:
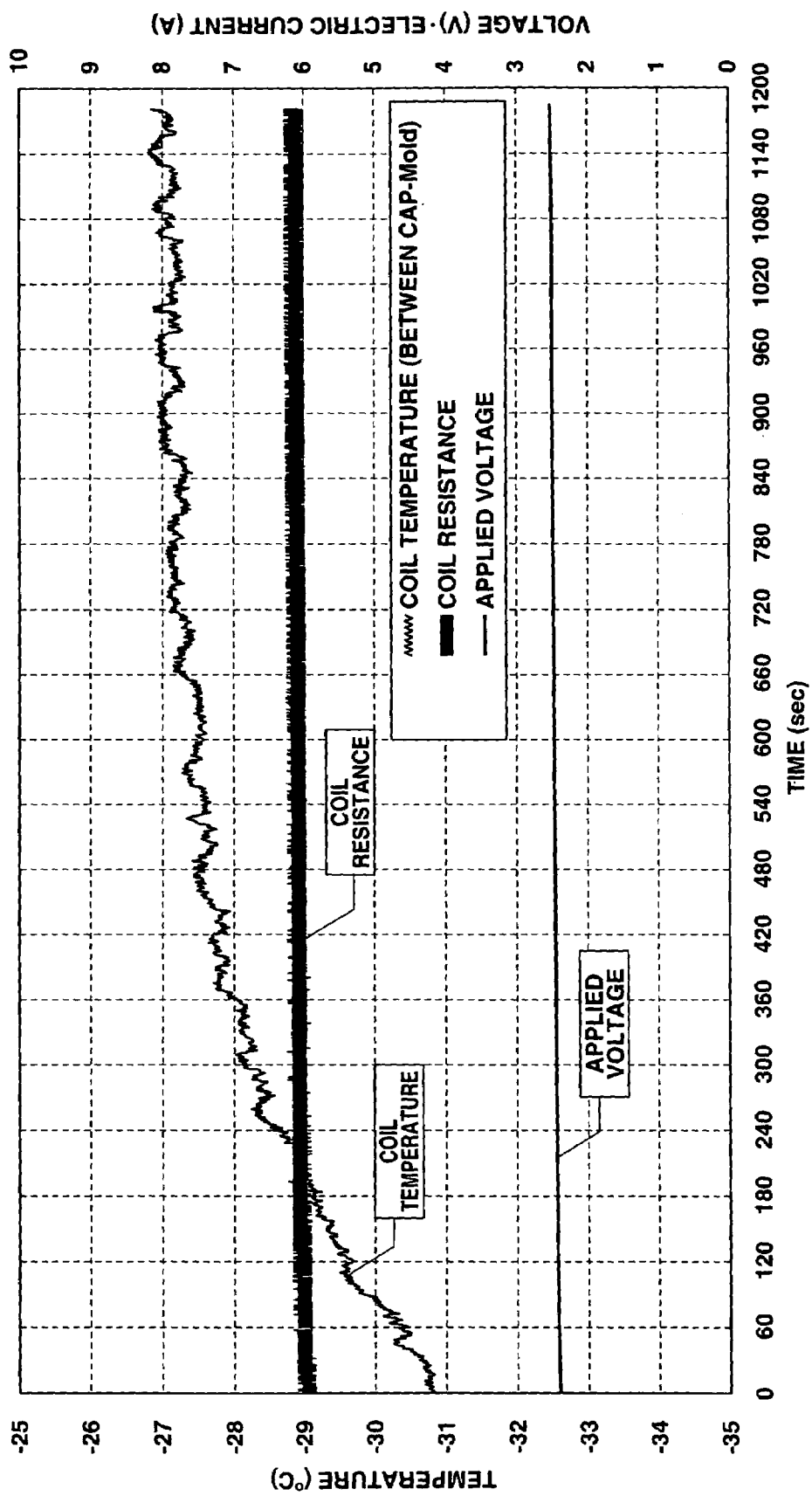
FIG. 13 is a graph showing a temperature rising characteristics of an electromagnetic coil of the VTC system upon electric current supply to the electromagnetic coil.

FIG. 13 shows change in the temperature rising in electromagnetic coil 28b upon supplying the electric current from above electronic controller 36 to electromagnetic coil 28b. This data in FIG. 13 is obtained upon monitoring the temperature around movable plunger 28d in a condition where the electric current applied from electronic controller 36 to electromagnetic coil 28b is constant. The monitoring is made in a condition where the applied electric current is 0.4 A, and a temperature in ambient air around solenoid 28 is about −30° C.

As apparent also from this temperature characteristic graph of FIG. 13 in which the duty ratio is equivalent to a constant value, so that the temperature in electromagnetic coil 28b is raised thereby raising the resistance in electromagnetic coil 28b. Therefore, in case that the constant voltage is applied, the amount of the electric current is decreased as the temperature rises in electromagnetic coil 28b, so that an effective temperature rising cannot be obtained. However, the temperature in electromagnetic coil 28b can be effectively raised by making such a control that a predetermined amount of electric current flows upon monitoring the amount of the electric current.

It will be understood that the present invention is not limited to the above embodiment, and therefore in case that the VTC is applied to an exhaust side, the relative rotational phase between the crankshaft and cam shaft 2 is controlled to the most timing-advancing side at the engine starting. Additionally, it is possible to apply this invention to various systems in an engine other than the valve timing control system in the internal combustion engine.

As appreciated from the above, according to the present invention, the maximum opening cross-sectional area of the supplying port communicated with the supplying passage is larger than the minimum passage cross-sectional area of the supplying passage. Therefore, in case that the above supplying port is opened at the maximum since the driven mechanism requires the maximum flowing amount, the flowing passage resistance of the hydraulic fluid flowed from the supplying passage through the flowing passage change-over valve into the driven mechanism can be sufficiently reduced. As a result, the speed of the hydraulic fluid supplied to the driven mechanism in this invention becomes faster than that in the conventional technique thereby improving a driving response in the driven mechanism.

Hereinafter, discussion will be made on technical ideas other than the claimed invention, comprehended from the above embodiments.

A valve timing control system for an internal combustion engine includes a phase changing mechanism changing a relative rotational phase of a cam shaft to a crank shaft upon selectively supplying and discharging a hydraulic pressure to and from a timing-advancing chamber and a timing-retarding chamber. A flow passage change-over valve controls the hydraulic pressure supplied to or discharged from the timing-advancing chamber and the timing-retarding chamber. A supplying passage is fluidly provided between the oil pump and the flowing passage change-over valve. Oil passages are provided between the flowing passage change-over valve and the timing-advancing chamber or the timing-retarding chamber. The flowing passage change-over valve includes a valve body having a plurality of ports which are respectively communicated with the supplying passage and the oil passage, and a spool valve body slidably disposed inside the valve body to open and close each port. The maximum opening cross-sectional area of the supplying port directly communicating with the supplying passage is larger than the minimum passage cross-sectional area of the supplying passage.

With the above idea, the opening cross-sectional area of the supplying port is set larger than the minimum passage cross-sectional area of the supplying passage. As a result, the operational response of the valve timing control system is improved particularly at the engine starting.

As discussed above, discussion has been made on the preferable embodiments for carrying out the present invention. The invention is not limited to the embodiments described above. Modifications and variations of the embodiment described above will occur to those skilled in the art, in light of the above teachings.

The entire contents of Japanese Patent Applications Nos. 2005-316572, filed Oct. 31, 2005, and 2006-252255, filed Sep. 19, 2006 are incorporated by reference.

What is claimed is:

1. A hydraulic control system for an internal combustion engine, comprising:
   a driven mechanism driven by hydraulic pressure fed under pressure from an oil pump of the internal combustion engine;
   a flowing passage change-over valve for controlling hydraulic pressure supplied from the oil pump to the driven mechanism;
   a section defining a supplying passage fluidly disposed between the oil pump and the flowing passage change-over valve; and
   a section defining an oil passage fluidly disposed between the flowing passage change-over valve and the driven mechanism,
   wherein the flowing passage change-over valve includes a valve body formed with a plurality of ports which are respectively communicated with the supply passage and the oil passage, and a spool valve body slidably disposed in the valve body to open and close the plurality of ports, the ports including a supplying port directly communicated with the supplying passage,
   wherein a maximum cross-sectional area of the supplying port is larger than a minimum cross-sectional area of the supplying passage,
   wherein the flowing passage change-over valve is supplied with electric current to heat hydraulic fluid kept in the flowing passage change-over valve so as to lower a viscosity of the hydraulic fluid.

2. A hydraulic control system as claimed in claim 1, wherein supplying the electric current to the flowing passage change-over valve is carried out for a predetermined time in a phase angle at which the driven mechanism is controlled in a timing-retarding side.

3. A hydraulic control system as claimed in claim 1 or 2, wherein a passage cross-sectional area of the oil passage and a opening cross-sectional area of the port directly communicated with the oil passage are larger than a minimum passage cross-sectional area of the supplying passage.

4. A hydraulic control system as claimed in claim 1, further comprising a section defining a plurality of branching passages for accomplishing communication between the oil passage and oil chambers formed in the driven mechanism, a sum of passage cross-sectional areas of the branching passages is larger than the maximum opening cross-sectional area of the port directly communicated with the oil passage.

5. A hydraulic control system as claimed in claim 1, wherein the driven mechanism is a valve timing control system for variably changing opening and closing timings of an engine valve in accordance with an operating condition of the engine.

6. A hydraulic control system as claimed in claim 1, wherein supplying the electric current to the flowing passage change-over valve is carried out in accordance with a control signal output from a control device at an engine starting.

7. A hydraulic control system for an internal combustion engine, comprising:
a driven mechanism driven by hydraulic pressure fed under pressure from an oil pump of the internal combustion engine;
a section defining a supplying passage communicated with the oil pump;
a section defining an oil passage communicated with the driven mechanism; and
a flowing passage change-over valve for controlling hydraulic pressure supplied from the oil pump to the driven mechanism, including a port valve body formed with a supplying port communicated with the supplying passage, and an oil passage port communicated with the oil passage, and a spool valve body slidably disposed inside the valve body to open and close at least one of the supplying port and the oil passage port, a maximum cross-sectional area of the supplying port being larger than a minimum cross-sectional area of the supplying passage,
wherein the flowing passage change-over valve is supplied with electric current before starting of the internal combustion engine to discharge hydraulic fluid kept in the flowing passage change-over valve, and supplied with electric current at the starting of the internal combustion engine to heat hydraulic fluid kept in the flowing passage change-over valve so as to lower a viscosity of the hydraulic fluid.

8. A hydraulic control system as claimed in claim 7, wherein the supplying electric current to the flowing passage change-over valve before the starting of the internal combustion engine is carried out predetermined times, each supplying electric current taking a predetermined time, wherein the supplying electric current to the flowing passage change-over valve at the starting of the internal combustion engine is carried out for a predetermined time.

9. A method of controlling a variable valve mechanism, comprising:
receiving hydraulic fluid fed under pressure from an oil pump of an internal combustion engine through a supplying passage in a port of a flowing passage change-over valve which port has a maximum opening cross-sectional area larger than a minimum passage cross-sectional area of the supplying passage;
controlling a flowing passage change-over valve for controlling the hydraulic fluid upon changing a flowing passage to another port by using a spool valve body slidably disposed in a valve body to open and close the port; and
heating hydraulic fluid kept in the flowing passage change-over valve by supplying electric current to the flowing passage change-over valve at starting of the internal combustion engine, the electric current being supplied for a predetermined period to lower a viscosity of the hydraulic fluid.

10. A method as claimed in claim 9, further comprising supplying the electric current to the flowing passage change-over valve before starting of the internal combustion engine to discharge the hydraulic fluid kept in the flowing passage change-over valve, the supplying the electric current being carried out at least before the heating.

* * * * *